(12) United States Patent
Berliner et al.

(10) Patent No.: US 6,247,067 B1
(45) Date of Patent: Jun. 12, 2001

(54) TRANSPARENTLY CONVERTING PROGRAM CALLS BETWEEN INTERFACES

(75) Inventors: Brian Berliner; Kevin W. Kayes, both of Colorado Springs, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/622,884

(22) Filed: Mar. 29, 1996

(51) Int. Cl.$^7$ ........................................ G06F 9/54
(52) U.S. Cl. ................................ 709/321; 709/324
(58) Field of Search ........................ 395/680, 681, 395/683; 709/315, 104, 103, 100, 321–327

(56) References Cited

U.S. PATENT DOCUMENTS

| | | | |
|---|---|---|---|
| 5,175,854 | * 12/1992 | Cheung et al. | 709/100 |
| 5,265,252 | * 11/1993 | Rawson, III et al. | 395/681 |
| 5,313,578 | * 5/1994 | Handorf | 395/680 |
| 5,638,517 | * 6/1997 | Bartek et al. | 395/200.76 |
| 5,909,576 | * 6/1999 | Fulk | 709/321 |

FOREIGN PATENT DOCUMENTS

| | | | |
|---|---|---|---|
| 0 588 046 | 3/1994 | (EP) | G06F/9/455 |
| 0 646 865 | 4/1995 | (EP) | G06F/9/455 |

OTHER PUBLICATIONS

IBM Technical Disclosure Bulletin, vol. 37, No. 10, Oct. 1994, pp. 441–444, "OS/2 Virtual Driver Support for CD–Rom", Armonk, NY.

* cited by examiner

*Primary Examiner*—St. John Courtenay, III
(74) *Attorney, Agent, or Firm*—Hogan & Hartson LLP

(57) ABSTRACT

Calls to a conventional device driver interface of a first operating are converted to operate with a device driver interface of a second operating system. A convention interface is created to appear identical to the conventional device driver interface of the first operating system, but the conversion interface operate in the second operating system. The conversion interface permits a program utilizing the conventional device driver interface of the first operating system to operate in the second operating system without modification to the source code.

16 Claims, 6 Drawing Sheets

WINDOWS 95

WINDOWS 3.1/3.11

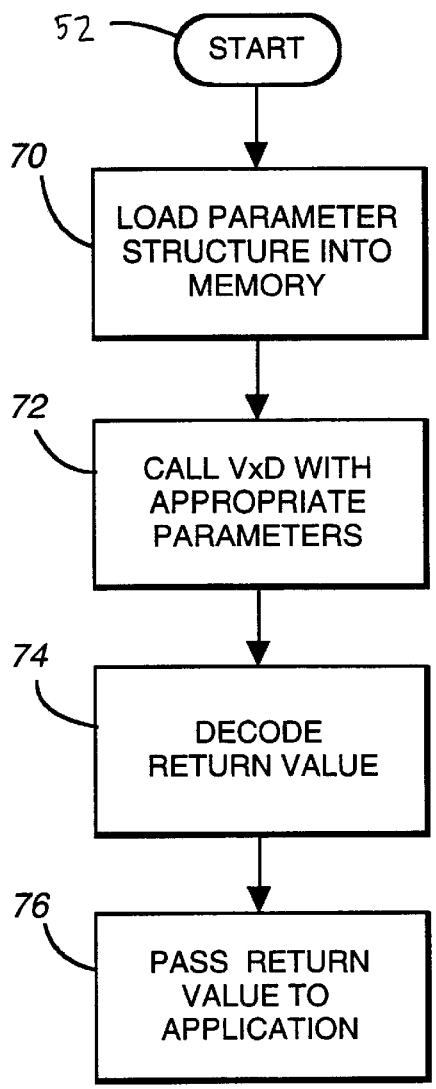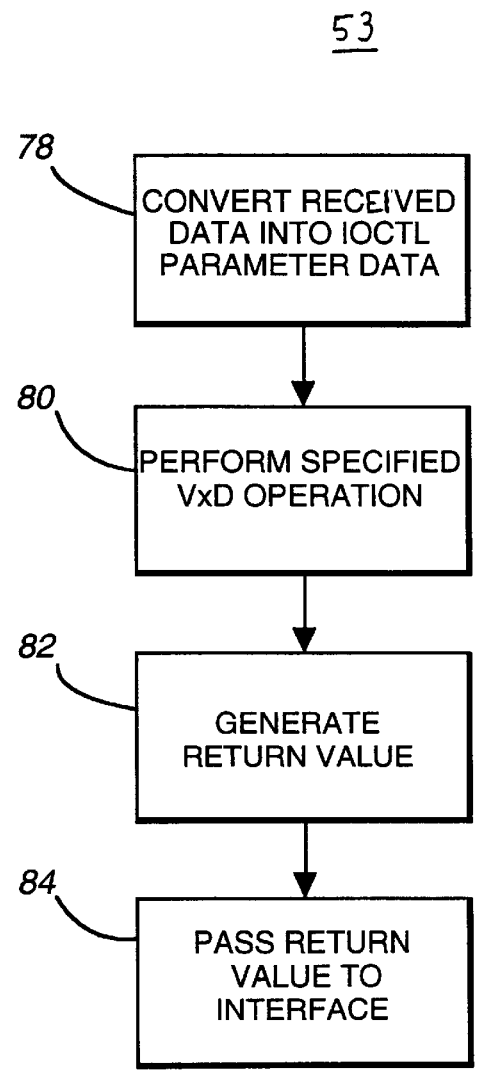
Fig. 8
Fig. 9

TRANSPARENTLY CONVERTING PROGRAM CALLS BETWEEN INTERFACES

CROSS-REFERENCE TO RELATED APPLICATIONS

The present invention is used in the invention described in commonly-assigned patent application Ser. No. 08/622,886 entitled EMBEDDING VIRTUAL DEVICE DRIVER (VxD) CALLS IN A DYNAMIC LINK LIBRARY (DLL) and filed concurrently herein. Now U.S. Pat. No. 6,041,363. The description of this cross-referenced application is incorporated herein by reference.

BACKGROUND OF THE INVENTION

1. Field of the Invention

The present invention relates to interfacing between an application program and a device driver in a computing system. More particularly, the invention relates to adapting an application program to communicate, without source code modification, with a device driver in a different operating system environment.

2. Description of Prion Art

Device drivers control devices in a computer operating system. Many contemporary computer architectures utilize levels or rings which are associated with access privileges relative to the operating system of the computer. At the lowest level, device drivers have unique relationships with the operating system in that they can typically have unrestricted access to all devices of the operating system, can freely examine data structures of the operating system, and can access memory locations. Furthermore, device drivers can also trap or intercept software and hardware interrupts which are detected by the operating system. Device drivers are typically maintained separately outside of application software so that the device drivers can be shared by different application programs which need to interface with devices of the operating system.

Application programs are generally one level removed from the device drivers. In order to utilize the function performed by the device driver, the application program typically makes calls to the device driver by passing parameters to and from the device driver through a software interface. In this manner, an application program can be written without the need of repeating the code contained in the device driver.

For example, the architecture employed by Microsoft's Windows[1] utilizes different levels for device drivers and application programs. FIG. 1 shows levels 20 and 22, respectively known as Ring 0 and Ring 3, in a Windows architecture. The virtual device driver 24, commonly referred to as a VxD, is a driver in the operating system in a Windows environment. Since the VxD communicates with the operating system and associated computer hardware (i.e., a microprocessor capable of 32 bit operations), the VxD is a 32 bit program. Application program 26, such as a graphical user interface (GUI), exists in Ring 3 of the Windows architecture. Because application program 26 exists at a different level than the device driver 24, there must be some means for communications between the application program and the device driver so that the application program can utilize the

[1] Windows, Windows 3.1, Windows 3.11, Windows 3.X, and Windows 95 are trademarks of Microsoft Corporation.

operating system functions performed by the device driver.

As shown in FIG. 2A, in Windows 3.1 and 3.11, collectively known as Windows 3.X, application program 28 communicates with the VxD device driver 32 through the interface 30, provided by software interface INT 2F. Windows 3.X generally supports 16 bit applications through the interface 30 to the VxD. In Windows 95, a new interface between application programs and device drivers has been developed by Microsoft. As shown in FIG. 2B, the interface 38, known as DeviceIOControl(), supports 32 bit application program 36 communicating with the VxD device driver 40.

As interfaces between application programs and device drivers, INT 2F and DeviceIOControl() operate differently. For instance, INT 2F is a software interrupt which utilizes the AX and BX registers of the operating system. When an application program seeks to communicate with a VxD of Windows 3.X, the application program must manipulate the AX and BX registers appropriately and then generate the software interrupt to pass the values stored in the AX and BX registers to the VxD driver. Inherently, the INT 2F interface requires that the application program utilize assembly language in its calls to the VxD.

In contrast, the DeviceIOControl() interface of Windows 95 is a high level callable function which has a variety of arguments associated with it. Because DeviceIoControl() is a callable function, a Windows 95 application program can communicate with the VxD without having to utilize assembly level software interrupts or manipulate registers of the operating system.

Since application programs are written to interact with the respective interface to the device driver, the interchangeability of these application programs between Windows 3.X and Windows 95 can be problematic. While Windows 95 supports applications written using the INT 2F interface of Windows 3.X, as shown in FIG. 2B, there presently is no interface between an application written for Windows 95 using the DeviceIOControl() interface to gracefully operate in a Windows 3.X environment. In other words, Windows 3.X only supports application programs which are written to use the INT 2F interface. An application program written for Windows 95 would not operate under Windows 3.X if the application program made calls to DeviceIOControl(). Hence, software developers writing programs for Windows 95 would have to substantially modify their programs to operate under a Windows 3.X environment. This incompatibility between the interfaces to the VxDs of Windows 95 and Windows 3.X results in inefficient production of software.

SUMMARY OF THE INVENTION

In accordance with this invention, the above problems have been solved by transparently converting program calls to a first device driver through a first interface in a first operating system, to program calls to a second device driver through a second interface in a second operating system. A conversion interface is maintained in the second operating system having identical calling characteristics, such as the interface name and the calling parameters, as the first interface. The conversion interface is initialized in response to a call from the program operating in the second operating system. A data stream is built based on information contained in the calling parameters, and is transferred through the second interface to the second device driver.

In this manner, a program written with program calls to the first interface in the first operating system can be used in the second operating system.

The above computer implemented steps in another implementation of the invention are provided as an article of manufacture, i.e., a computer storage medium containing a computer program of instructions for performing the above described steps.

In a machine implementation of the invention, an apparatus for transparently converting program calls to a first device driver through a first interface in a first operating system, to program calls to a second device driver through a second interface in a second operating system, has a conversion interface in the second operating system having identical calling characteristics as the first interface, including the identical interface name and calling parameters. An initializing module initializes the conversion interface responsive to a call from the program operating in the second operating system. A build/send module builds a data stream based on information contained in the calling parameters and transfers the data stream through the second interface to the second device driver.

In particular, the conversion interface, which is designed to look like the device driving interface of Windows 95, is created to operate in a Windows 3.X operating system. The conversion interface is capable of supporting calls from the application program to DeviceIOControl() by translating these calls into a format compatible with the INT 2F device driver interface of Windows 3.X.

All application programs can therefore be written utilizing high level calls to DeviceIOControl() irrespective of whether these application programs will be operating in a Windows 95 or Windows 3.X environment. The same source code can be compiled into either 32 bit format for use in Windows 95, or into 16 bit format for use in Windows 3.X.

Still another utility of the present invention is to permit the reuse of application software written for Windows 95 in a Windows 3.X environment.

Still another utility of the present invention is to provide a module, which can be included in a program library for compilation of application programs, for converting calls to DeviceIOControl under Windows 95 into calls for a Windows 3.X environment.

Still another utility of the present invention is to provide a transparent interface between an application program and a device driver of an operating system such that the interface is capable of converting from one device driver interface format to another device driver interface format.

The foregoing and other useful features and advantages of the invention will be apparent from the following more particular description of a preferred embodiment of the invention as illustrated in the accompanying drawings.

BRIEF DESCRIPTION OF DRAWINGS

FIG. 8 illustrates the logical operations performed by build/send module 52 of FIG. 5 to convert or transform the calls to DeviceIOControl() into parameters of the INT 2F format.

FIG. 9 illustrates the logical operations performed by the execute module 53 of FIG. 5 to convert parameters into IOCTL data for use by the VxD.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The present invention permits application programs written for a Windows 95 environment to be recompiled for a Windows 3.X environment without modification of the source code. The present invention translates the calls to DeviceIOcontrol(), the driver interface in Windows 95, into a format acceptable by the driver interface INT 2F of Windows 3.X. In this manner, source code written for Windows 95 can be used in either the Windows 95 environment or the Windows 3.X environment, as shown in FIG. 3.

Figure 4A:
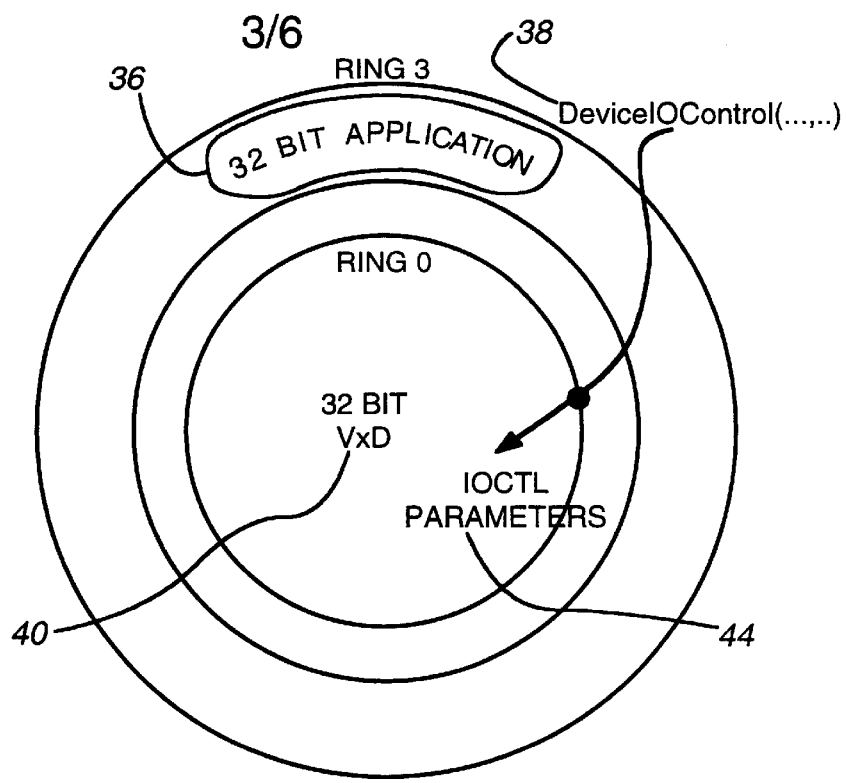
FIGS. 4A and 4B illustrate the program levels and the manner in which the interfaces interact.

FIG. 4A shows application 36 communicating with device driver 40 through standard interface 38 in a Windows 95 setting. When application 36 requires access to device driver 40, application 36 calls DeviceIOControl() interface 38 using the proper parameters. The operation of DeviceIOControl() interface 38 under Windows 95 is an eight parameter standard dictated by Microsoft. The arguments to DeviceIOControl() include a "handle", function number, input data pointer, size of input buffer, output data pointer, size of output buffer, pointer to a variable for receiving the output byte count, and a pointer for overlapped input or output. The "handle" is the addressed identifier of the device driver to be called and is maintained by the operating system, while the control code governs the operation to the performed by the given device driver. The IOCTL parameters 44 are derived from the information contained in the arguments of DeviceIOControl() interface 38, and are ultimately manipulated by the device driver 40 to perform the desired VxD function.

Figure 4B:
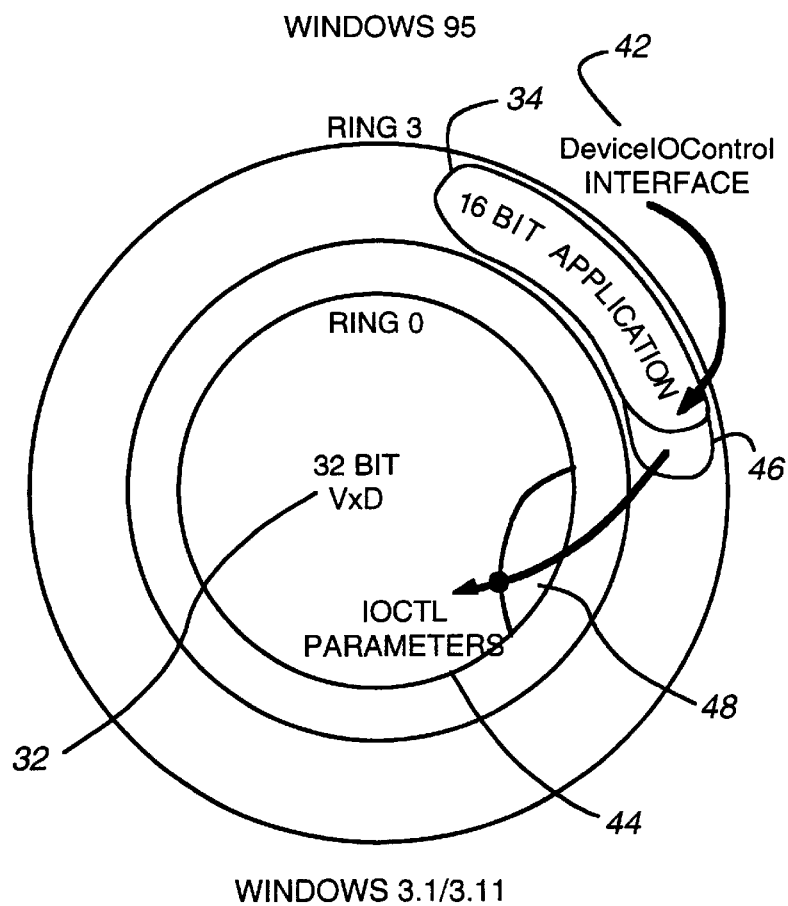

In a preferred embodiment of the present invention, a conversion interface 42 operates in Windows 3.X, as shown in FIG. 4B. The conversion interface 42 is designed so that from the perspective of application program 34, conversion interface 42 appears identical to Microsoft's DeviceIOControl() interface 38 of Windows 95. In this manner, an application program 36, written for operation in Windows 95, can be recompiled into a 16 bit application 34 and operate, without further modification, in a Windows 3.X environment as shown in FIG. 4B.

Figure 1:
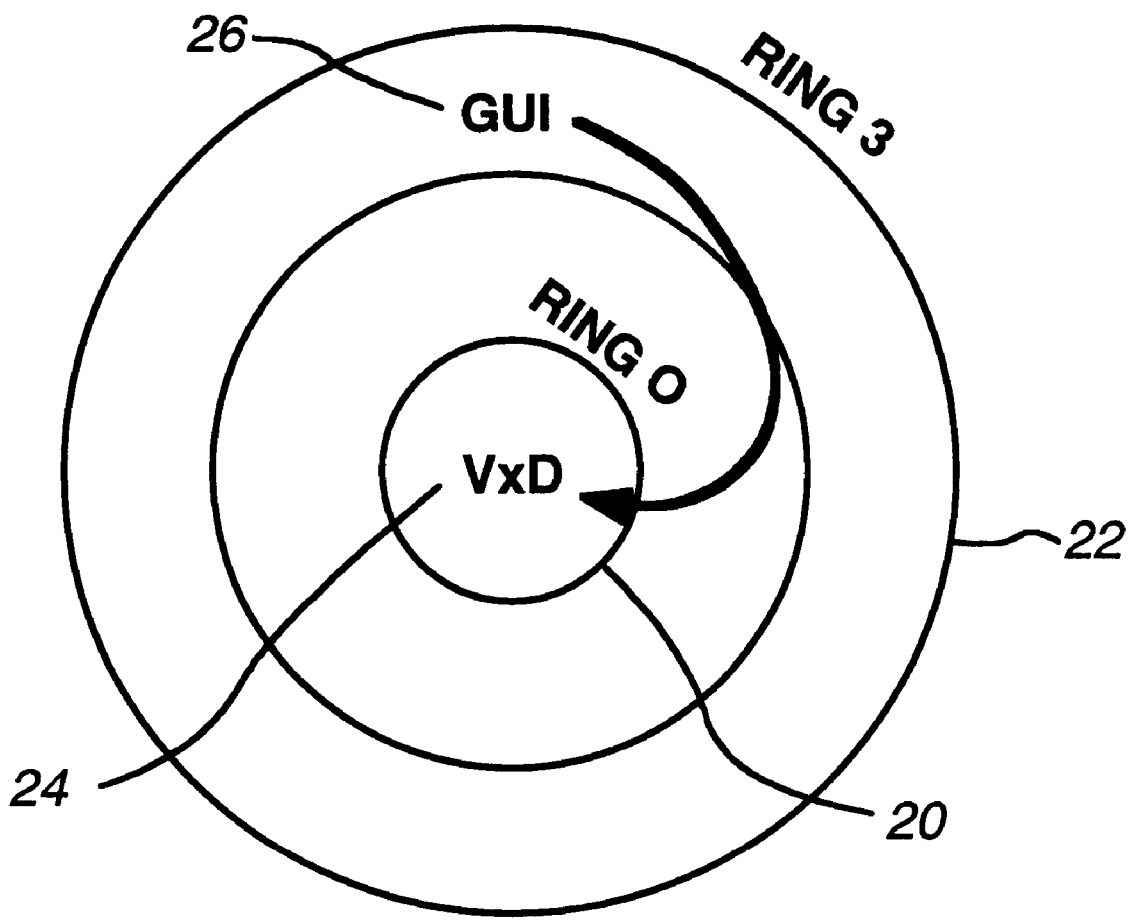
FIG. 1 illustrates the different levels of access of an application program and a device driver to the operating system in a computer architecture.
Figure 2A:
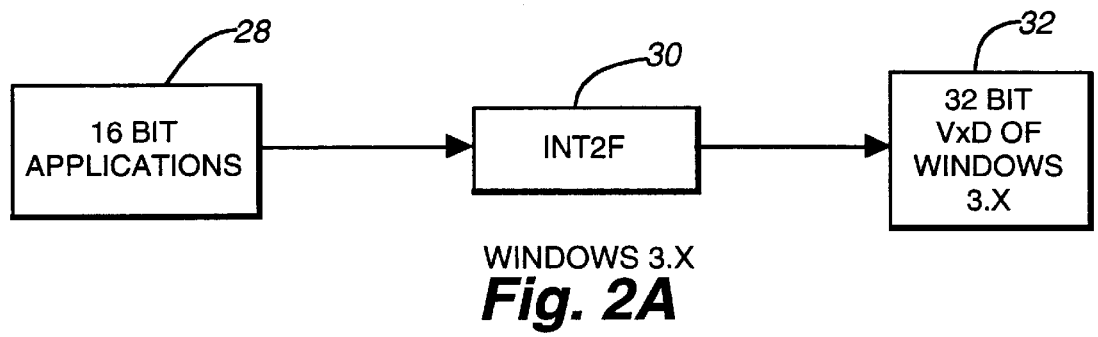
FIGS. 2A and 2B illustrate the different interfaces utilized between application programs and device drivers of Windows 3.X and Windows 95 respectively.
Figure 2B:
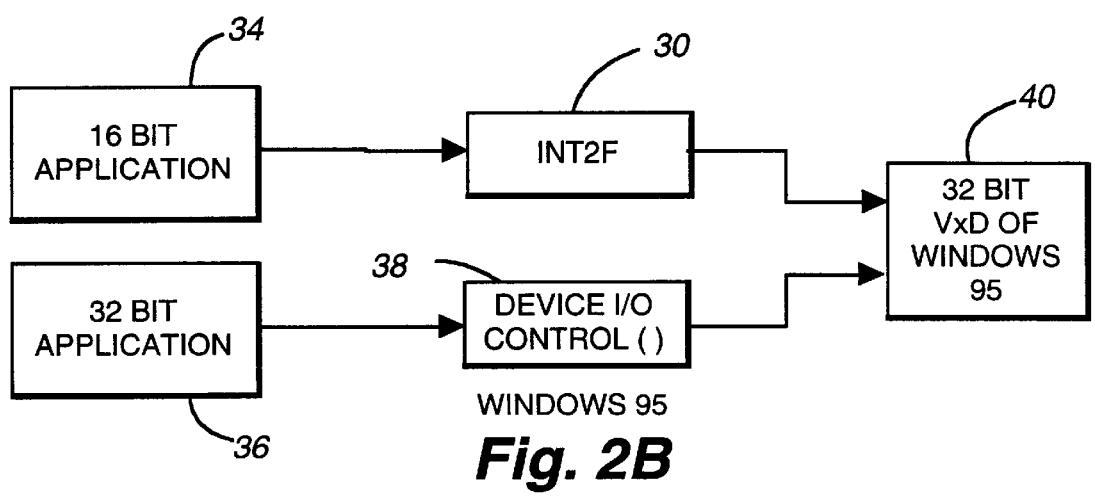
Figure 3:
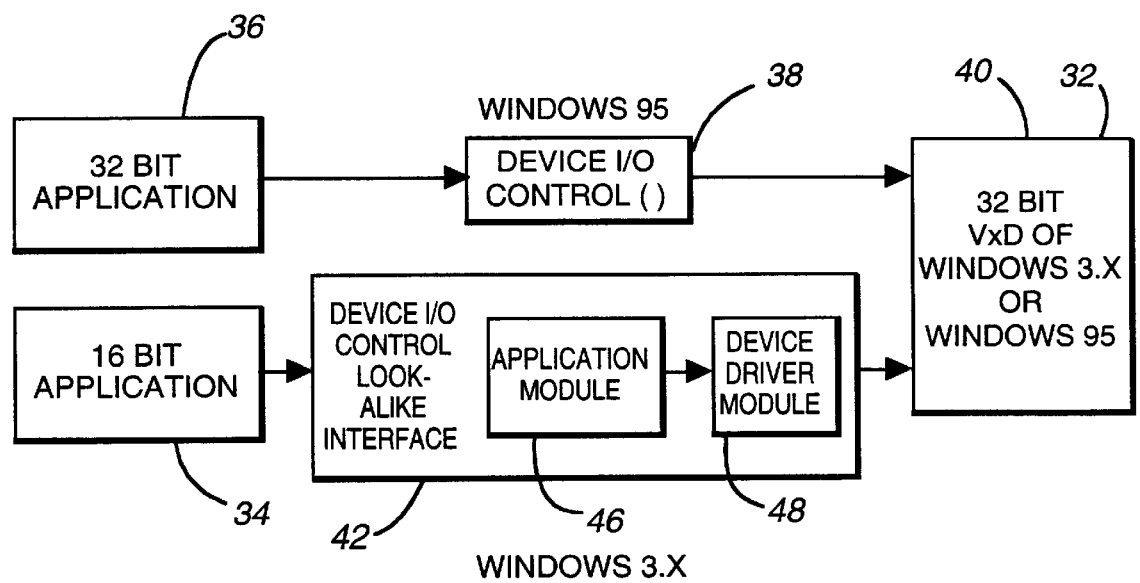
FIG. 3 is a block diagram of the present invention illustrating the manner in which the device driver interfaces are structured.

As shown in FIGS. 3 and 4B, conversion interface 42 is comprised of application module 46 and device driver module 48. Application module 46 is an application-level module, operating at ring 3, which can be included in any Windows 95 application program being complied for 16 bit operation in Windows 3.X. Application module 46 includes the initialize module 51 and the build/send VxD call module 52 shown in FIG. 5 and described below in detail.

Device driver module 48 (FIG. 4B) is a driver level module, operating at ring 0, which can be included in any VxD written for Windows 3.X. Device driver module 48 includes the execute VxD module 53 shown in FIG. 5 and described below in detail.

The application module 46 could be included as part of a library of files used in the compilation of application programs for Windows 3.X. Likewise, device driver module 48 could be included in a library of files used to compile virtual device driver software.

Figure 5:
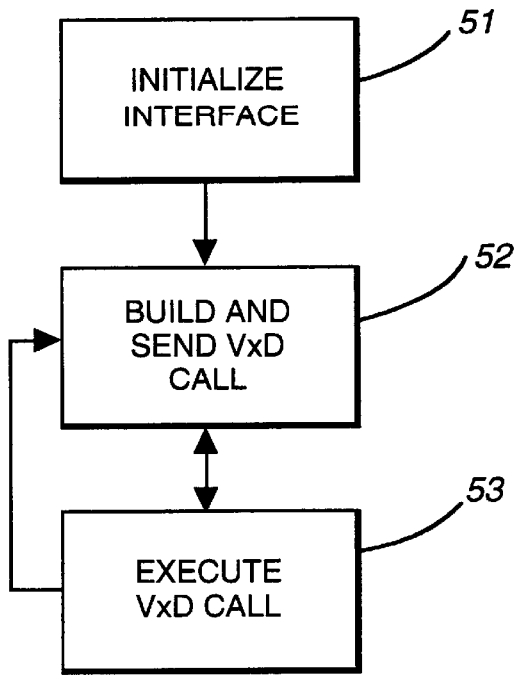
FIG. 5 shows a preferred embodiment of the present invention.

In FIG. 5, the preferred embodiment of the present invention utilizes three modules to provide access by an application program to the device driver operating under Windows 3.X. The initialize module 51, the build/send VxD call module 52, and the execute VxD module 53 perform the operations in a preferred embodiment of the present invention.

After the application program running in Windows 3.X issues a call to the DeviceIOControl() function supported by conversion interface 42, the initialize module 51 performs the necessary initialization operations to communicate with the appropriate VxD. For instance, initialize module 51 determines the entry point for a specified device driver, as well as whether or not Enhanced Mode of Windows 3.X is operational.

The build/send VxD call module 52 then builds the information needed to call the VxD using the interface INT 2F of Windows 3.X. Build module 52 passes parameter information between the application program and the device driver. The results obtained from initialize module 51 are used as arguments by module 52 in calling the VxD. Build module 52 also passes a return value, obtained from the device driver, to the application program indicating success or failure of the desired VxD operation.

The execute VxD module 53, located at the VxD level of the operating system, receives the information passed from module 52 and executes the appropriate VxD function.

As indicated in FIG. 5, once the initialize module 51 has been accessed, modules 52 and 53 can be repeatedly accessed until all of the desired VxD functions have been performed.

Figure 6:
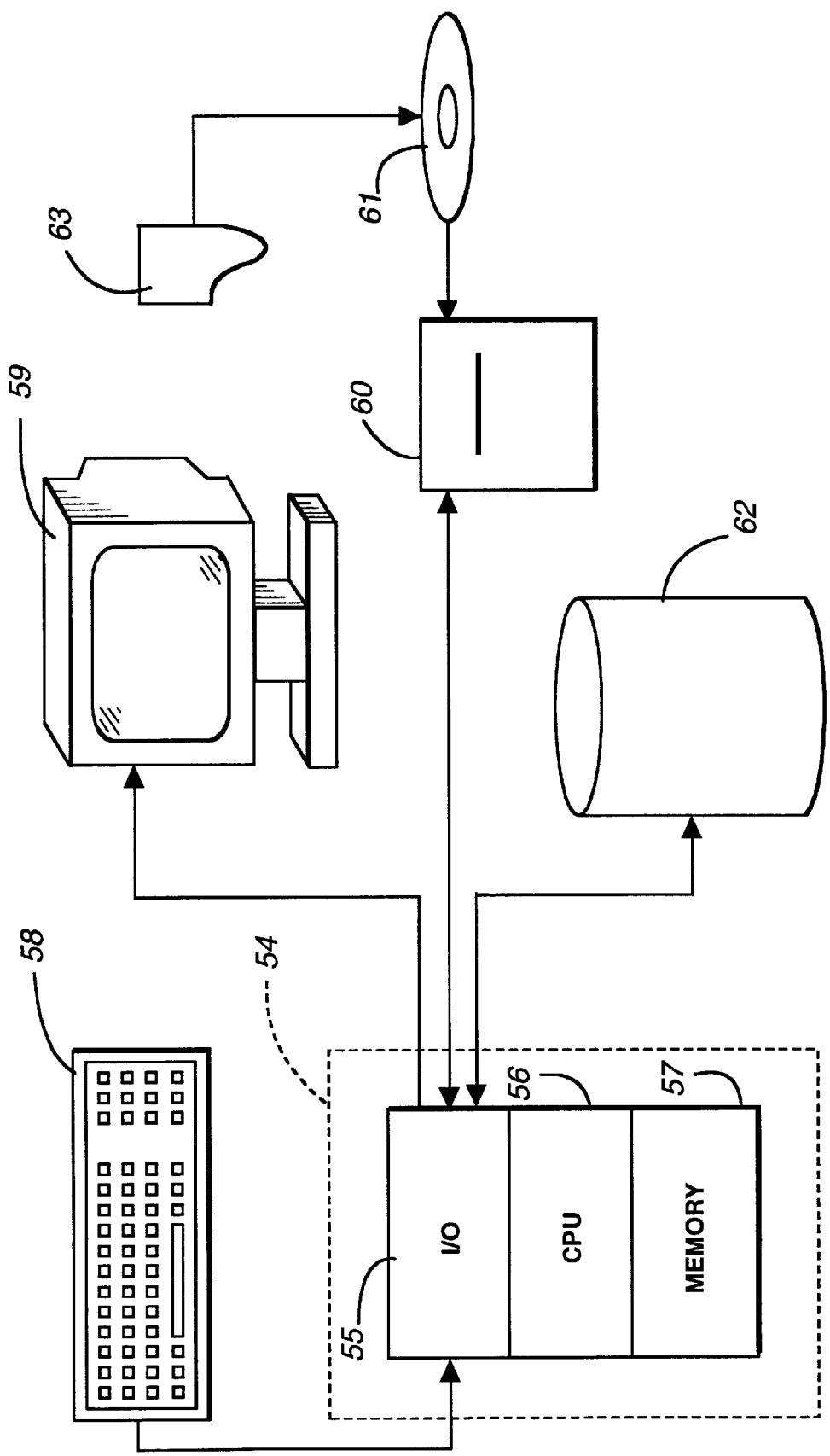
FIG. 6 illustrates a computing system to perform the computer implemented steps in accordance with the invention.

The operating environment, in which the present invention is used, encompasses a standalone computing system as well as the general distributed computing system. In the distributed computing system general purpose computers, workstations, or personal computers are connected via communication links of various types, in a client-server arrangement, wherein programs and data, many in the form of objects, are made available by various members of the system. Some of the elements of a standalone computer or a general purpose workstation computer are shown in FIG. 6, wherein a processor 54 is shown, having an input/output (I/O) section 55, a central processing unit (CPU) 56 and a memory section 57. The I/O section 55 is connected to a keyboard 58, a display unit 59, a disk storage unit 62 and a CD-ROM drive unit 60. The CD-ROM unit 60 can read a CD-ROM medium 61 which typically contains programs 63 and data. The computer program products containing mechanisms to effectuate the apparatus, and methods of the present invention may reside in the memory section 57, or on a disk storage unit 62, or on the CD-ROM 61 of such a system. Examples of such systems include SPARC systems offered by Sun Microsystems, Inc., personal computers offered by IBM Corporation and by other manufacturers of IBM-compatible personal computers, and systems running the UNIX operating system or Solaris™ operating system.

Figure 7:
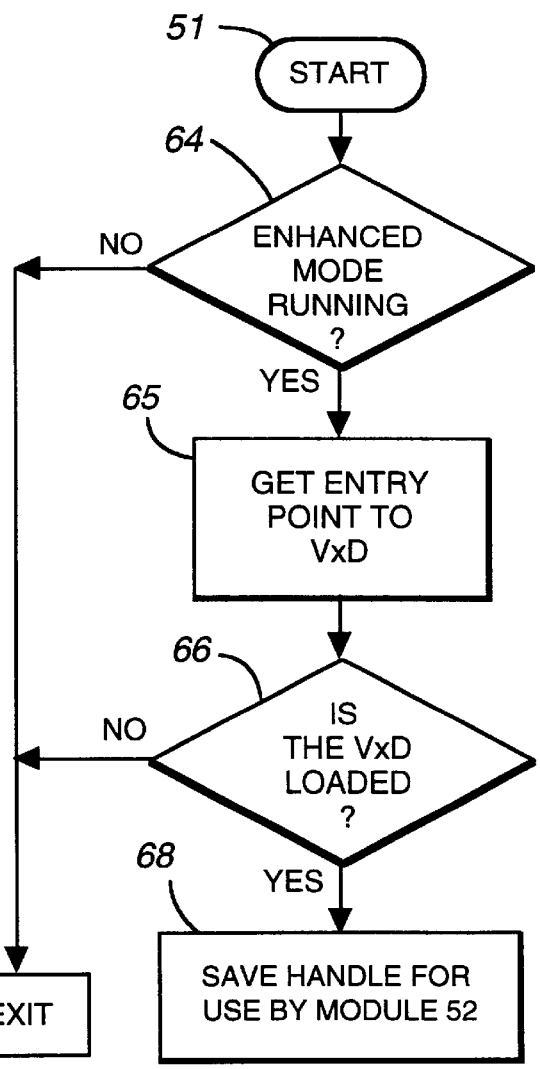
FIG. 7 illustrates the logical operations performed by the initialize module 51 of FIG. 5 to acquire the handle of the device driver.

In FIG. 7 the initialize module 51 (FIG. 5) begins at operation 64 which determines if Enhanced Mode of Windows 3.X is operational. If Enhanced Mode of Windows 3.x is not running, then the operation flow exits to the application program without further action. This test is performed since the conversion interface of the preferred embodiment of the present invention is designed to interact with 32 bit device drivers which operate in Enhanced Mode of Windows 3.X. In order to determine if Enhanced Mode of Windows 3.X is operational, software interrupt from interface INT 2F can be utilized with assembly level calls. If decision operation 64 detects Enhanced Mode of Windows is operational, then the operation flow proceeds to determine the entry point for the desired device driver.

Operation 65 acquires the application program interface (API) entry point to the device driver. This entry point is known as the "handle" to the VxD, and both identifies the VxD and indicates the VxD's standard entry point. Using the device driver's I.D provided in the argument to the DeviceIOControl call from the application program, operation 65 determines the handle of the specified driver and stores the call-back address of the driver into memory as a 32 bit address to be passed to the application program. Again, software interrupt of the interface INT 2F is utilized to acquire and perform these operations in Windows 3.X.

Decision operation 66 determines if the specified device driver is not presently loaded in the operating system. If the specified VxD is not loaded, then at decision operation 66 the operation flow exits to the application program without further action. If, however, the specified device driver is loaded and enhanced mode of Windows is operational, then operation 68 saves the handle for later use by build/send module 52 (FIG. 5) of conversion interface 42 (FIG. 3).

FIG. 8 illustrates the logical operations implemented by the build/send module 52 of conversion interface 42. Since conversion interface 42 is designed to resemble the DeviceIOControl() interface of Windows 95, shown as interface 38 in FIG. 3A, application programs written using Windows 95 DeviceIOControl() interface 38 can be compiled to operate within the Windows 3.X environment. Conversion interface 42 therefore uses the same arguments and parameters as used by Windows 95 DeviceIOControl interface 38.

These arguments include the handle to the device to be manipulated by the device driver, a control code of the operation to be performed by the device driver, and a variety of data pointers. This information is structured by the build/send module 52 into a data stream which will be decoded by the execute module 48 in the device driver.

In FIG. 8, the logical operation of the build/send module 52 (FIG. 5) begin at operation 70. Operation 70 transfers into memory the parameters/arguments provided by the application calling program. Operation 72 builds the data stream, to be passed to the execute module 53 (FIG. 5) in the VxD, from the parameters transferred into memory.

Operation 72 then calls the device driver through interface INT 2F using the appropriate parameters. The INT 2F interface passes these parameters from the application level to the device driver level of the operating system.

Device driver module 48 (FIG. 4B), containing execute module 53, is designed to interpret the data from the data stream created by module 52 and instruct the device driver to act appropriately, as will be explained with operations 78–80 of FIG. 9.

Upon completion of action taken by the device driver, a return value is generated and passed to module 52 and decoded at operation 74. This return value could be a binary digit indicating success or failure of the desired operation, or data indicating a variety of different results. Operation 76 passes this return value to the application program for use therein.

FIG. 9 shows the logical operations implemented in device driver module 48 by the execute module 53 in this embodiment of the present invention. Upon receiving the structured data from build/send module 52, operation 78 converts the data into IOCTL parameters 44 (FIG. 4B) for use by the virtual device driver. The data used in formulating IOCTL parameters 44 is derived from the arguments provided by the application program call to DeviceIOControl.

Operation 80 uses this converted data to perform the specified VxD operation. The specific operation performed by the VxD is a matter of choice governed by the conventional software contained in the VxD.

Operation 82 of module 53 generates a return value indicating, for example, the success or failure of the requested operation to be performed by operation 80. Operation 84 passes the return value up to module 52 for ultimate transfer to the application program.

This entire operation flow in FIGS. 7–9 is transparent to both conventional application programs written for Windows 95 and to conventional device drivers. By using the present invention, application programs written for Windows 95 can be operated without modification in a Windows 3.X environment.

As previously mentioned, the present invention could be included in linkable libraries to permit a software developer with access to the present invention. The application module 46, including initialize module 51 and build/send module 52, could be included as part of a library of files used in the compilation of application programs for Windows 3.X. Likewise, device driver module 48, including execute VxD operation module 53, could be included in a library of files used to compile virtual device driver software.

While the invention has been particularly shown and described with reference to preferred embodiments thereof, it will be understood by those skilled in the art that various other changes in the form and details made by made therein without departing from the spirit and scope of the invention.

What is claimed is:

1. In a computer, an apparatus for transparently converting program calls to a first device driver through a first interface in a first operating system, to program calls to a second device driver through a second interface in a second operating system, wherein program calls to the first interface in a first operating system are incompatible to program calls to the second interface in the second operating system, the computer having a processor, an input/output device, and a storage device, said apparatus comprising:

a conversion interface operable in the second operating system, said conversion interface having identical calling characteristics as the first interface, said calling characteristics including the interface name and the calling parameters;

an initializing module to initialize said conversion interface responsive to a call from a program written with program calls to said first interface in said first operating system; and a build/send module operable in the second operating system for building a data stream based on information contained in said calling parameters and transferring said data stream through said second interface to said second device driver, so that a program written with program calls to said first interface in said first operating system can operate in said second operating system.

2. The apparatus of claim 1, further comprising:

a conversion module in the second device driver for converting the data stream received from the build/send module into a data structure usable by the second device driver;

an execution module for performing a specified operation in the second device driver responsive to the data structure; and a feedback module for generating a return value in the second device driver, said return value indicating the success or failure of the specified operation, and for passing said return value through the second interface to the conversion interface.

3. The apparatus of claim 2, wherein the first operating system is a Windows 95 operating system and the second operating system is a Windows 3.X operating system.

4. In a computing system having a processor, a program that generates program calls having a format associated with a first interface, said calls being incompatible with a second interface, and a second operating system, a method for transparently converting program calls having the format associated with the first interface to program calls having a format associated with a second interface, wherein the first interface is associated with a first operating system and a first device driver and the second interface is associated with the second operating system and a second device driver, the method comprising the steps of:

initializing a conversion interface responsive to a call from the program that generates calls having the format associated with the first interface, said conversion interface operable in the second operating system and having identical calling characteristics as the first interface, said calling characteristics including an interface name and calling parameters;

building a data stream for transmission by said conversion interface to said second device driver in said second operating system based on information contained in said calling parameters; and transferring said data stream through said second interface to said second device driver, whereby the program that generates calls having the format associated with the first interface can operate in said second operating system.

5. The method of claim 4, wherein the initializing step further comprises:

determining if the second device driver is presently loaded in the second operating system;

acquiring an address of the second device driver; and storing the address of the second device driver for subsequent use by the conversion interface in communicating with the second device driver.

6. The method of claim 4, wherein the building step further comprises:

storing the calling parameters received from the call by the program; and manipulating the calling parameters to conform to the format required by the second interface.

7. The method of claim 4, further comprising the steps of:

decoding a return value generated by the second device driver, said return value indicating success or failure of an operation performed by the second device driver in response to the call from the program; and passing said return value to the program for processing therein.

8. The method of claim 4, further comprising the steps of:

in the second device driver, converting the data stream received from the transferring step into a data structure usable by the second device driver;

performing a specified operation in the second device driver responsive to the data structure;

generating a return value in the second device driver, said return value indicating success or failure of the specified operation; and passing said return value through the second interface to the conversion interface.

9. The method of claim 7, wherein:

the initializing step further comprises the steps of determining if the second device driver is presently loaded in the second operating system, acquiring an address of the second device driver, and storing the address of the second device driver for subsequent use by the conversion interface in communicating with the second device driver; and the building step further comprises the steps of storing the calling parameters received from the call by the program, and manipulating the calling parameters to conform to the format required by the second interface.

10. The method of claim 9, further comprising:

in the second device driver, converting the data stream received from the transferring step into a data structure usable by the second device driver;

performing a specified operation in the second device driver responsive to the data structure;

generating the return value in the second device driver, said return value indicating success or failure of the specified operation; and passing said return value through the second interface to the conversion interface.

11. A computer program storage medium readable by a computing system having a second operating system and encoding a computer program of instructions for executing a computer process for transparently converting program calls having a format associated with the first interface, said calls being incompatible with a second interface, to program calls having a format associated with a second interface, wherein the first interface is associated with a first operating system and a first device driver and the second interface is associated with the second operating system and a second device driver, said computer process comprising the steps of:

initializing a conversion interface operable in the second operating system, said conversion interface responsive to a call from the program that generates calls having the format associated with the first interface, said conversion interface in the second operating system having identical calling characteristics as the first interface, said calling characteristics including an interface name and calling parameters;

building a data stream based on information contained in said calling parameters; and transferring said data stream through said second interface to said second device driver, so that the program that generates calls having the format associated with the first interface can operate in said second operating system.

12. The computer program storage medium of claim 11 wherein the computer process of the computer program step of initializing further comprises the steps of:

determining if the second device driver is presently loaded in the second operating system;

acquiring an address of the second device driver; and storing the address of the second device driver for subsequent use by the conversion interface in communicating with the second device driver.

13. The computer program storage medium of claim 11 wherein the computer process of the computer program step of building further comprises the steps of:

storing the calling parameters received from the call by the program; and manipulating the calling parameters to conform to the format required by the second interface.

14. The computer program storage medium of claim 11 wherein the computer process of the computer program further comprises the steps of:

in the second device driver, converting the data stream received from the transferring step into a data structure usable by the second device driver;

performing a specified operation in the second device driver responsive to the data structure;

generating a return value in the second device driver, said return value indicating success or failure of the specified operation; and passing said return value through the second interface to the conversion interface.

15. The computer program storage medium of claim 14, further comprising the steps of:

determining if the second device driver is presently loaded in the second operating system;

acquiring an address of the second device driver;

storing the address of the second device driver for subsequent use by the conversion interface in communicating with the second device driver.

16. The computer program storage medium of claim 15, wherein the step of building a data stream further comprises the steps of:

storing the calling parameters received from the call by the program; and manipulating the calling parameters to conform to the format required by the second interface.

* * * * *

UNITED STATES PATENT AND TRADEMARK OFFICE
CERTIFICATE OF CORRECTION

PATENT NO. : 6,247,067 B1
DATED : June 12, 2001
INVENTOR(S) : Berliner et al.

Page 1 of 1

It is certified that error appears in the above-identified patent and that said Letters Patent is hereby corrected as shown below:

<u>Title page,</u>
Item [56], insert the following:

<u>OTHER DOCUMENTS</u>
<u>Writing Windows VxDs and Device Drivers</u>, Karen Hazzah, 1994, pp. 182-189

Signed and Sealed this

Eleventh Day of September, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.    : 6,247,067 B1
DATED         : June 12, 2001
INVENTOR(S)   : Brian Berliner et al.

It is certified that error appears in the above-identified patent and that said Letters Patent is hereby corrected as shown below:

<u>Title page,</u>
Item [57], ABSTRACT,
Line 2, after "operating", insert -- system --
Line 3, delete "convention", insert -- conversion --

<u>Column 1,</u>
Line 23, delete "Prion", insert -- Prior --
Line 62, after "can utilize the", insert -- operating system functions performed by the device driver. --
Lines 63-64, footnote 1, delete "operating system functions performed by the device driver."

Signed and Sealed this

Second Day of July, 2002

*Attest:*

JAMES E. ROGAN
*Director of the United States Patent and Trademark Office*

*Attesting Officer*